(12) United States Patent
Bearss et al.

(10) Patent No.: US 7,034,955 B2
(45) Date of Patent: Apr. 25, 2006

(54) USING A PROCESSOR ENHANCED MEMORY MODULE TO ACCELERATE HARDCOPY IMAGE PROCESSING WITHIN EXISTING PRINTER CONTROLLER

(75) Inventors: James Glenn Bearss, Boise, ID (US); Judd E. Heape, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1046 days.

(21) Appl. No.: 09/998,828

(22) Filed: Dec. 3, 2001

(65) Prior Publication Data

US 2002/0080404 A1 Jun. 27, 2002

Related U.S. Application Data

(60) Provisional application No. 60/254,674, filed on Dec. 11, 2000.

(51) Int. Cl.
*G06F 15/00* (2006.01)
*G06F 13/00* (2006.01)

(52) U.S. Cl. ............... 358/1.16; 358/1.15; 358/1.13; 358/1.14; 358/1.17; 358/1.18; 358/302; 348/207.2; 348/207.1; 348/207.11

(58) Field of Classification Search ...... 358/1.11–1.18, 358/450, 452; 348/207.1, 20, 207.99; 355/40; 399/137, 145; 709/200–201, 217, 219; 705/26–27
See application file for complete search history.

(56) References Cited

U.S. PATENT DOCUMENTS 6,067,352 A * 5/2000 Douhet et al. ............ 379/93.25
6,798,532 B1 * 9/2004 Okino ....................... 358/1.15

* cited by examiner

*Primary Examiner*—Twyler M. Lamb
(74) *Attorney, Agent, or Firm*—Robert D. Marshall, Jr.; W. James Brady, III; Frederick J. Telecky, Jr.

(57) ABSTRACT

The processor enhanced memory module PEMM can be incorporated into the hardcopy image processing pipeline of existing printer controllers by using the smart memory model. Here the data generated from RISC based PDL interpretation or pre-rasterized data can be processed in an accelerated fashion into page bit maps, color space converted, and compressed by the PEMM. Since the DSP on the PEMM is programmable, the resolution, color space, and type of compression along with other printer specific processing can have formats other than those determined by the fixed functionality of the ASIC devices present in the pipeline.

12 Claims, 6 Drawing Sheets

USING A PROCESSOR ENHANCED MEMORY MODULE TO ACCELERATE HARDCOPY IMAGE PROCESSING WITHIN EXISTING PRINTER CONTROLLER

This application claims priority under 35 USC §119(e)(1) of Provisional Application No. 60/254,674, filed Dec. 11, 2000.

TECHNICAL FIELD OF THE INVENTION

The technical field of this invention is printer control by computer.

BACKGROUND OF THE INVENTION

Conventional computer printers typically utilize laser or ink-jet technology to transfer a raster description of the text and images to be printed into a complete printed page. Such printers make use of printer controllers that normally employ a combination of RISC processors and ASIC devices or ASIC devices having embedded RISC processors. Printer controllers perform the raster image processing required to convert the page description language (PDL) statements and raster files sent to the printer into a form that the printer can act upon.

Typically within the printer controller, the RISC/ASIC devices are employed in a pipeline to perform first the task of interpreting printer control language/post script instructions/data and forming a display list equivalent. Then the second stage performs rendering of data from display lists and converts it to printer specific raster data. These tasks usually require a significant amount of memory within the printer. Such local memory for the printer controller pipeline is usually supplied by way of standard memory modules SIMM/DIMM configured to suit the printer controller application.

FIG. 1 illustrates the steps required to process the input data that a printer typically receives from a conventional personal computer (PC). The output from the PC normally is supplied by a printer driver 101 that prepares an output print file. This file includes a set of instructions and data in printer control language and postscript (x.ps) format. These instructions and data are carried to the printer via standard RS232 or IEEE 1284 cabling and stored in an input buffer memory device 102, typically a first-in-first-out (FIFO) memory. The first computational step in the printer controller pipeline is interpretation 103 of the input Post Script (PS) or printer Control language (PCL) data and form page description language PDL.

Interpretation requiring intensive 'if-then-else' processing occurs in the interpretation pipeline stage 103. This process is well suited to the RISC processor. The PDL output from interpretation includes a description of individual elements of graphics data or text data along with the position of these elements on the page. PDL may be in a banded or non-banded format. In banded format discrete bands are defined and formed as a part of the processing and a number of these bands will collectively form, after rendering, a full printer controller output page. In non-banded format, each page is interpreted as a unit and forms, after rendering, an integral part of printer controller output.

The rendering process step 104 reduces the interpreted data to printer specific raster data. The output of the rendering process is a bit map (x.bmp) format in which discrete digitized dots (pixels) are generated to control the output device (e.g. ink-jet pen, laser drum) with proper composite proportions of red, blue, or green. While the format of typical display units is normally in a true R-G-B (red-green-blue) format, the usual format required for typical printer output devices is C-Y-M-K (cyan-yellow-magenta-black), which is a standard chrominance-luminance description format. Pixel data coded in C-Y-M-K can be used to exactly duplicate the three-color information in an R-G-B pixel. The rendering step involves intense multiply-accumulate processing which can be handled by the RISC processor, but is even more suited to a digital signal processors. After rendering, the bit map data is stored in an output buffer memory stage 105 where it is sent as needed to the print head output registers 106.

FIG. 2 illustrates the basic construction of parallel processing and shared memory wherein a main processor device 205 with memory divided into banks 200–203 shares a portion of one or more banks with a parallel digital signal processor 206 which has additional local memory. This architectural arrangement was described by Pawate et al in U.S. Pat. No. 5,678,021 and described further as applied to processor enhanced memory modules PEMM in U.S. patent application Ser. No. 09/058,000. In FIG. 2 the special sections of memory Bank 3 203 are allotted to control register memory space 208 and shared memory 209. This allows the main processor to store configuration data for the co-processor DSP 206 in these special registers and provide all the control signals to drive DSP 206 through a prescribed set of subroutines.

SUMMARY OF THE INVENTION

A PEMM, usually in the form factor of a standardized memory module, comprises memory, a processing element, in the present embodiment a digital signal processor DSP, and any necessary embedded control hardware or software to handle its interface to the host system. The DSP within the PEMM can be dedicated to a specific task, or be programmed by the host system to accelerate the present task at hand. Some or all of the memory included on the PEMM can be shared between the host processor and PEMM processors allowing both to operate on a common set of data (e.g. graphics, text or mixed-mode documents). Because the PEMM operates in the direct memory map of the host processor, and not on a separate peripheral bus, the PEMM enables true parallel processing at the highest possible system bandwidth. Since the PEMM is usually in the form of a standard memory module, one or more at one time can be plugged into a variety of host systems, including but not limited to personal computers, workstations, printers, and Internet appliances.

The PEMM can be incorporated into the hardcopy image processing pipeline of existing controllers by using the smart memory model. Here the data generated from RISC based PDL interpretation or pre-rasterized data can be processed in an accelerated fashion into page bit maps, color space converted, and compressed by the PEMM. Since the DSP on the PEMM is programmable, the resolution, color space, and type of compression along with other printer specific processing can have formats other than those determined by the fixed functionality of the ASIC devices present in the pipeline.

BRIEF DESCRIPTION OF THE DRAWINGS

These and other aspects of this invention are illustrated in the drawings, in which.

DETAILED DESCRIPTION OF PREFERRED EMBODIMENTS

Figure 3:
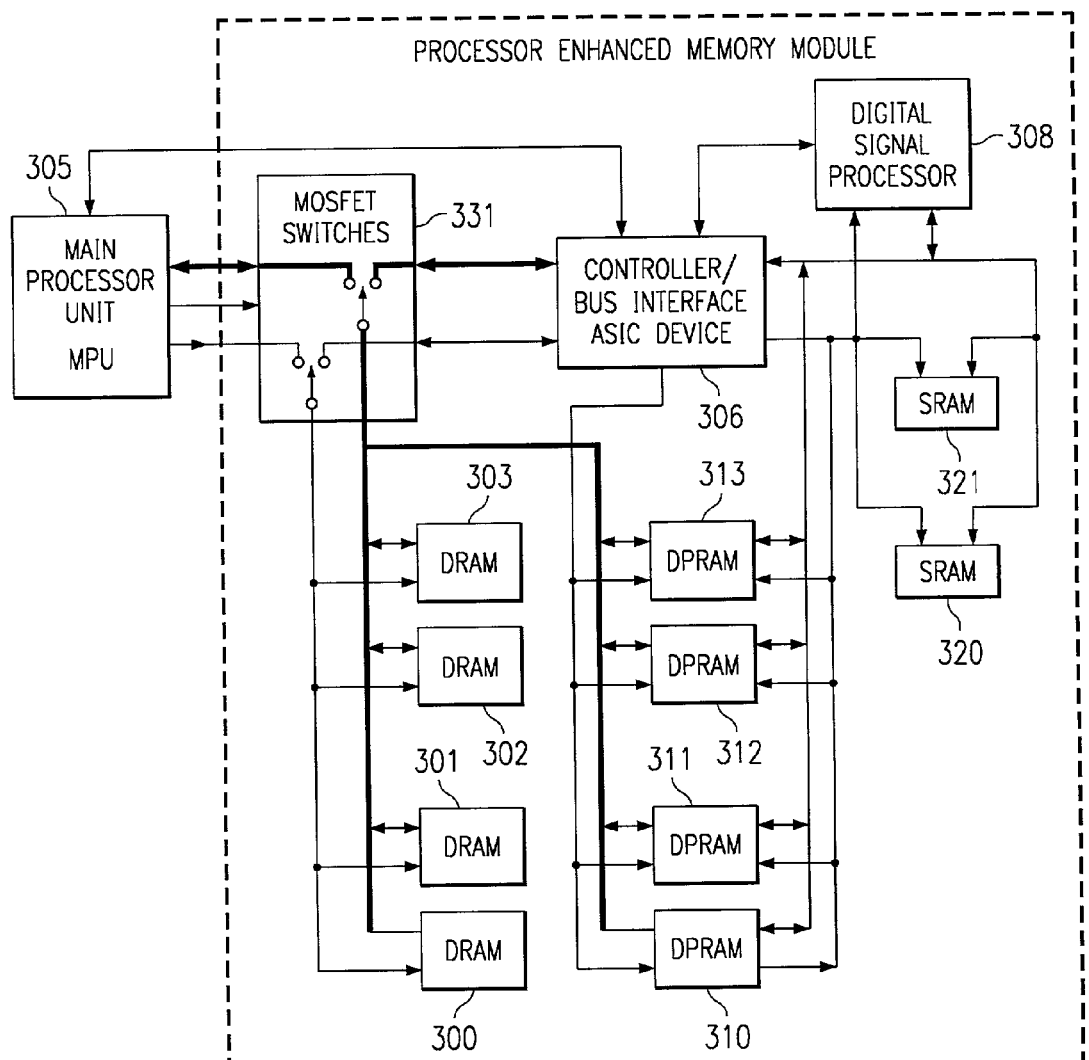
FIG. 3 illustrates a processor enhanced memory module with smart shared memory.

In FIG. 3 the basics of a processor enhanced memory module (PEMM) is illustrated. The basic PEMM of this embodiment makes use of an ASIC Controller/Bus Interface device 306 and a bank of four standard single port DRAM devices 300–303 as well as a bank of four dual port DRAM devices labeled DPRAM 310–313. Additionally the enhancing processor, in this embodiment digital signal processor 308, includes additional local SRAM memory 320–321. MOSFET switches 331, under control of main processor unit 305, allow the source of address and data to be switched from main processor unit 305 or the controller bus interface ASIC device 306.

The PEMM can be used to replace standard memory functions and add special processing power to a module in the same physical space that a stand-alone memory module would occupy. PEMM was described in U.S. patent application Ser. No. 09/058,000. Such applications of the PEMM have been described as 'smart memory' which may be of two types 'smart shared memory' or 'smart local memory' depending on the needs of the application.

Figure 1:
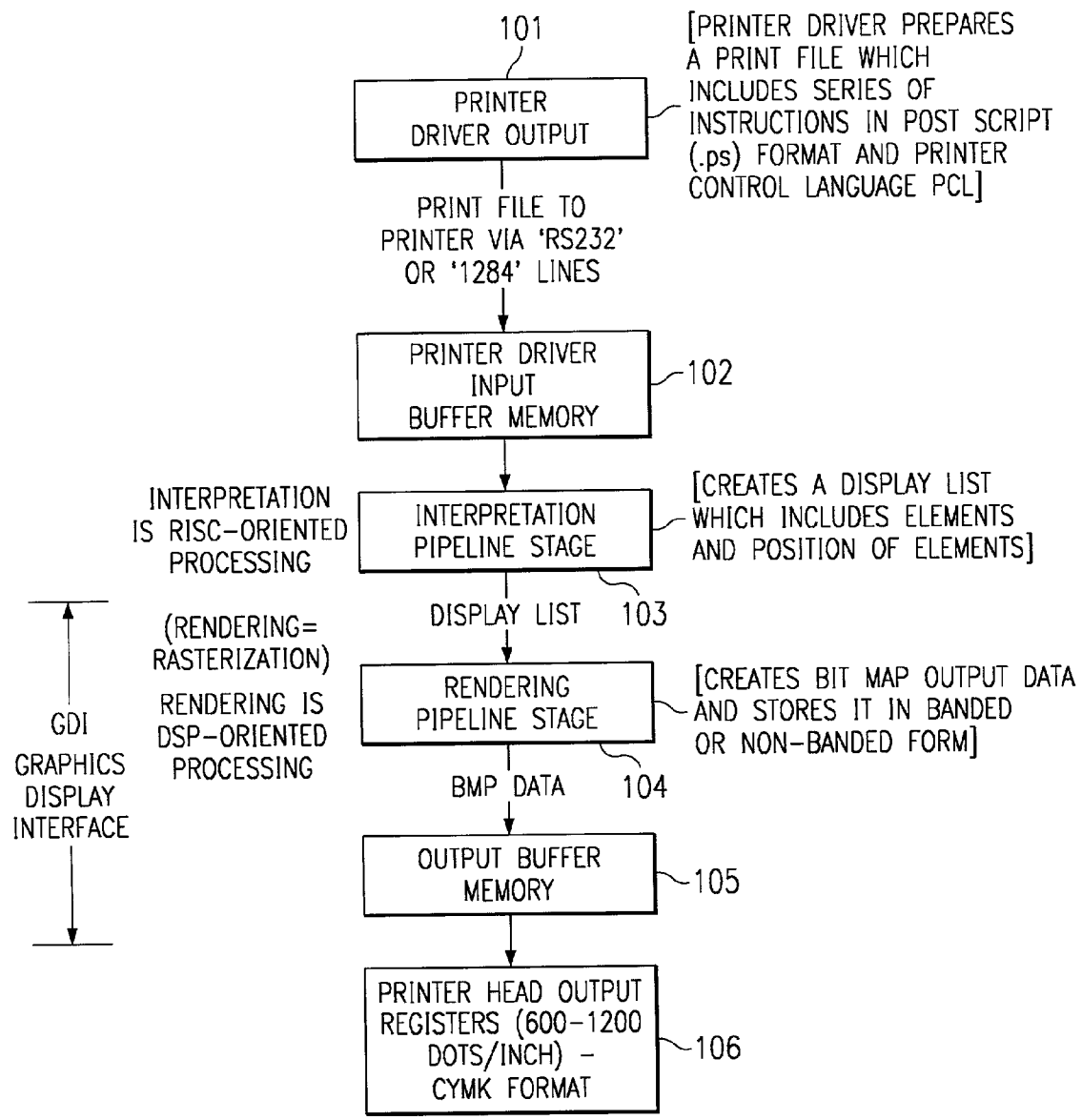
FIG. 1 illustrates a printer controller pipeline requirement according to the prior art.
Figure 2:
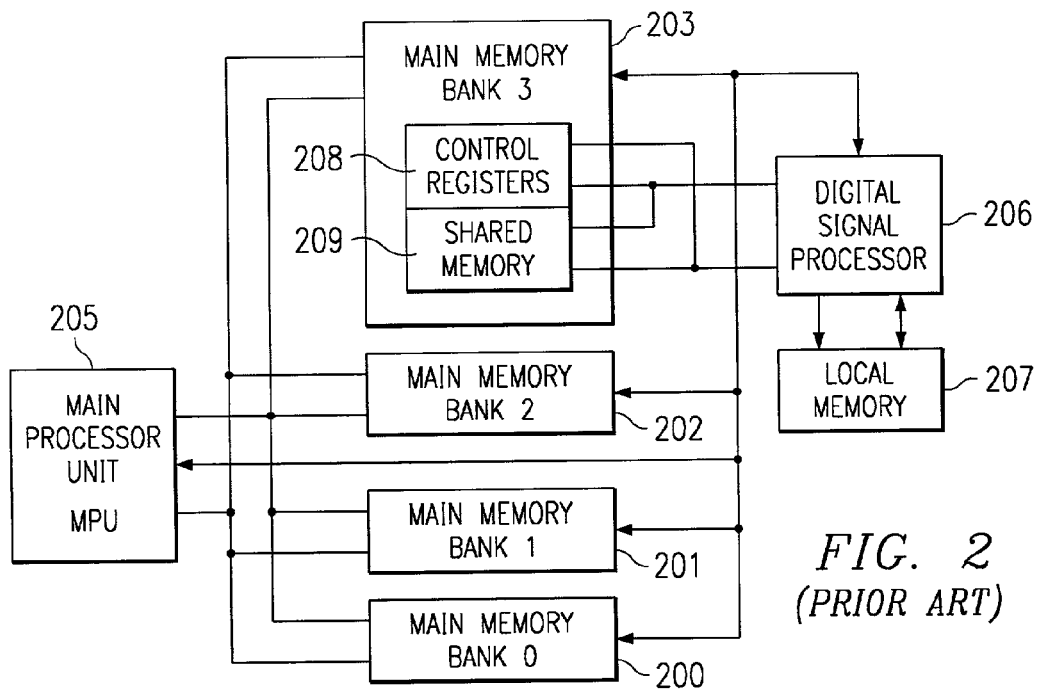
FIG. 2 illustrates a shared memory multiprocessor system according to the prior art.
Figure 4:
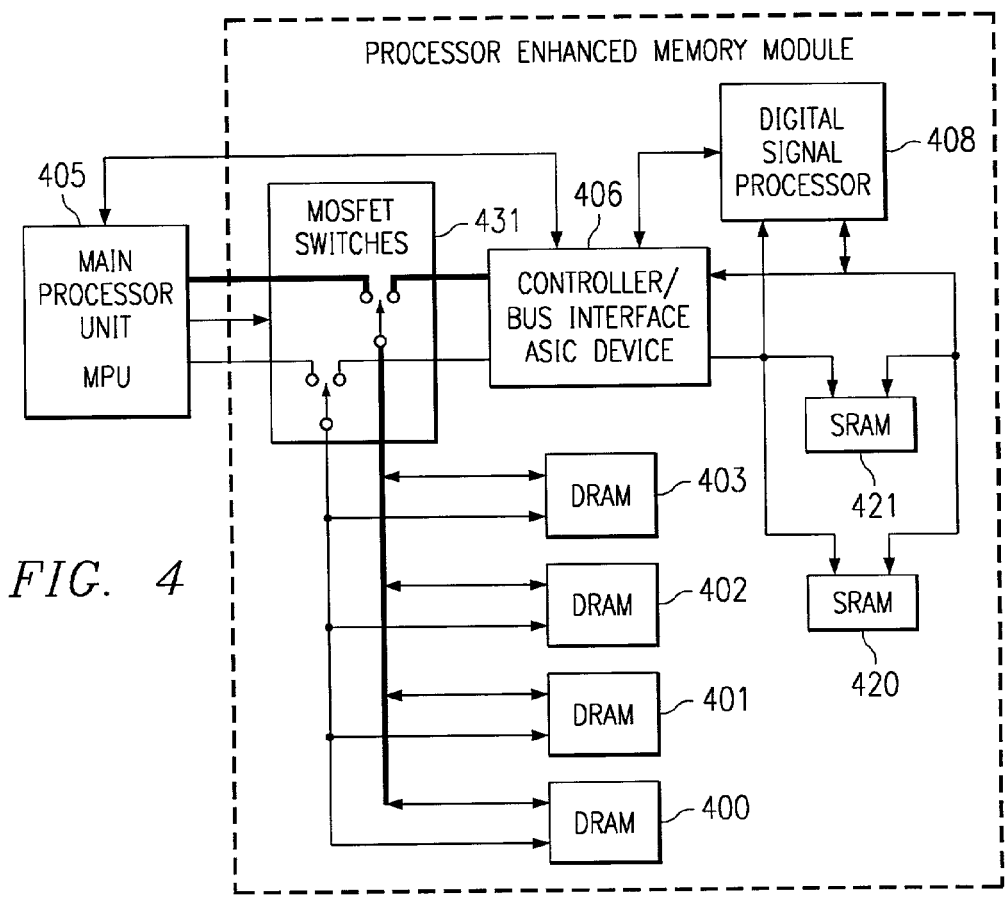
FIG. 4 illustrates a processor enhanced memory module with smart local memory.

FIG. 3 gives illustration of the 'smart shared memory' the sharing being supplied by including the DPRAM devices 310–313. These DPRAMS are accessible with equal facility to the DSP 308 as well as main processor unit 305. FIG. 4 gives illustration of a 'smart local memory' in which there are no dual-port DPRAM devices. The DSP 408 operates using primarily the SRAM devices 420, 421 for temporary storage. The controller/bus interface ASIC device 406 performs the task of passing data resulting from DSP 408 processing from the SRAM units 420, 421 to the DRAM units 400–403. Once again, MOSFET switches 431, under control of the main processor unit, allow the source of address and data to be switched from the main processor unit or the controller bus interface ASIC device. Normal printer controller functions which are the subject of this invention can be implemented using 'smart local memory' such as illustrated in FIG. 4.

Figure 5:
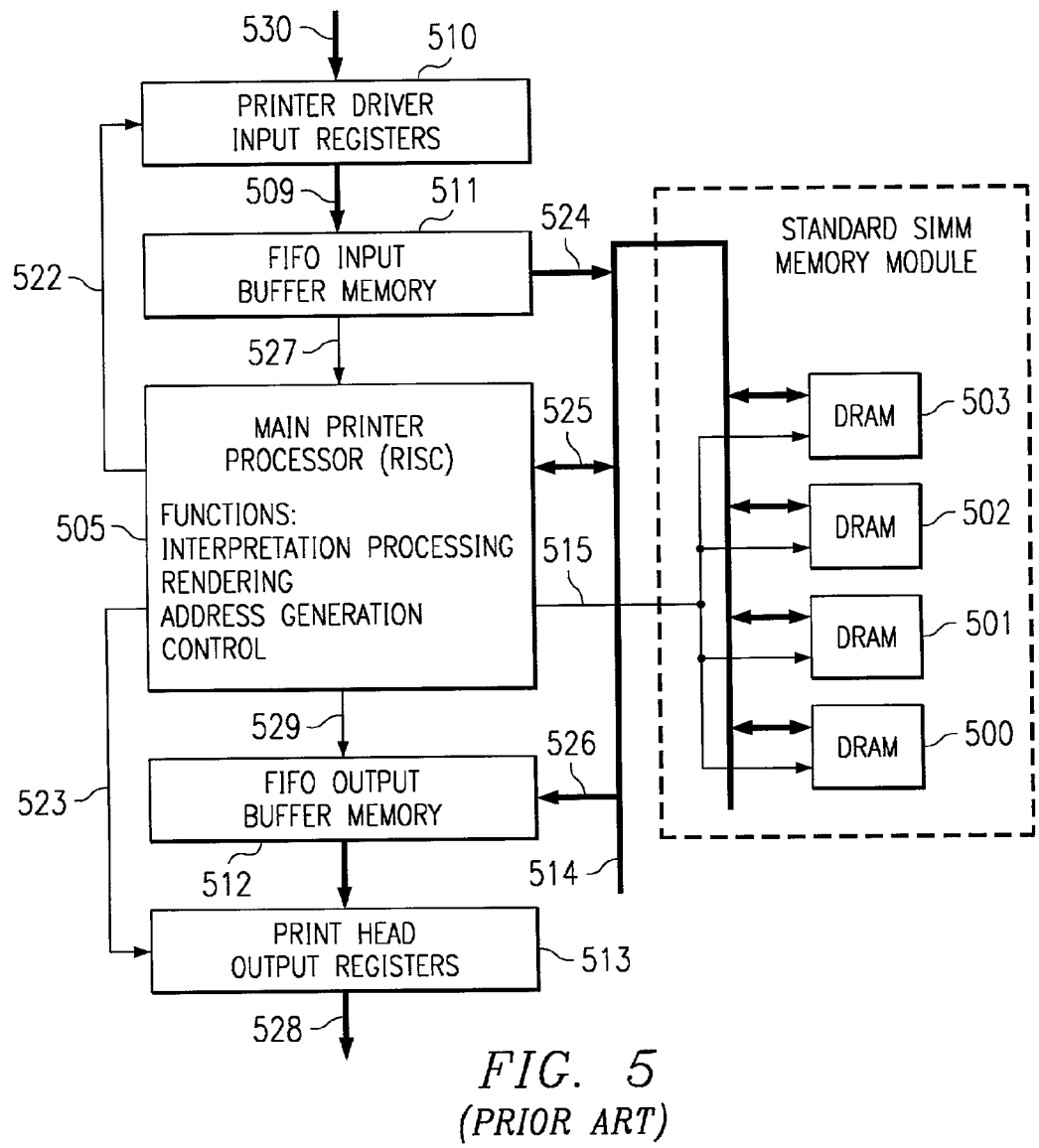
FIG. 5 illustrates a conventional printer controller pipeline using standard SIMM/DIMM memory module according to the prior art.

FIG. 5 illustrates a conventional printer controller pipeline using standard SIMM/DIMM memory module technology. Input data/instructions 530 from the personal computer printer driver is received at the printer driver input registers 510 and stored in a FIFO input buffer memory 511. The main printer processor 505 directs the data from the FIFO 511 to be stored in the DRAM memory 500–503 and retrieved as needed by the processor 505. In this architecture the main processor 505 performs virtually all pipeline processing steps as well as all control and addressing functions. Data is passed from the DRAM to the processor and from the processor to the DRAM at all incremental process steps. Pipeline output data is passed to the FIFO output buffer memory 512 in a form suitable to supply the print head output registers 513 with printer specific raster data 528 as needed. Memory bus 514 provides a common I/O path for data to and from the input FIFO 524, the main processor 525, and the output FIFO 526. Processor control signals, 515, 527 and 527, direct memory and FIFO functions. Signals 522 and 523 are main processor control signals for the input and output registers respectively.

Figure 6:
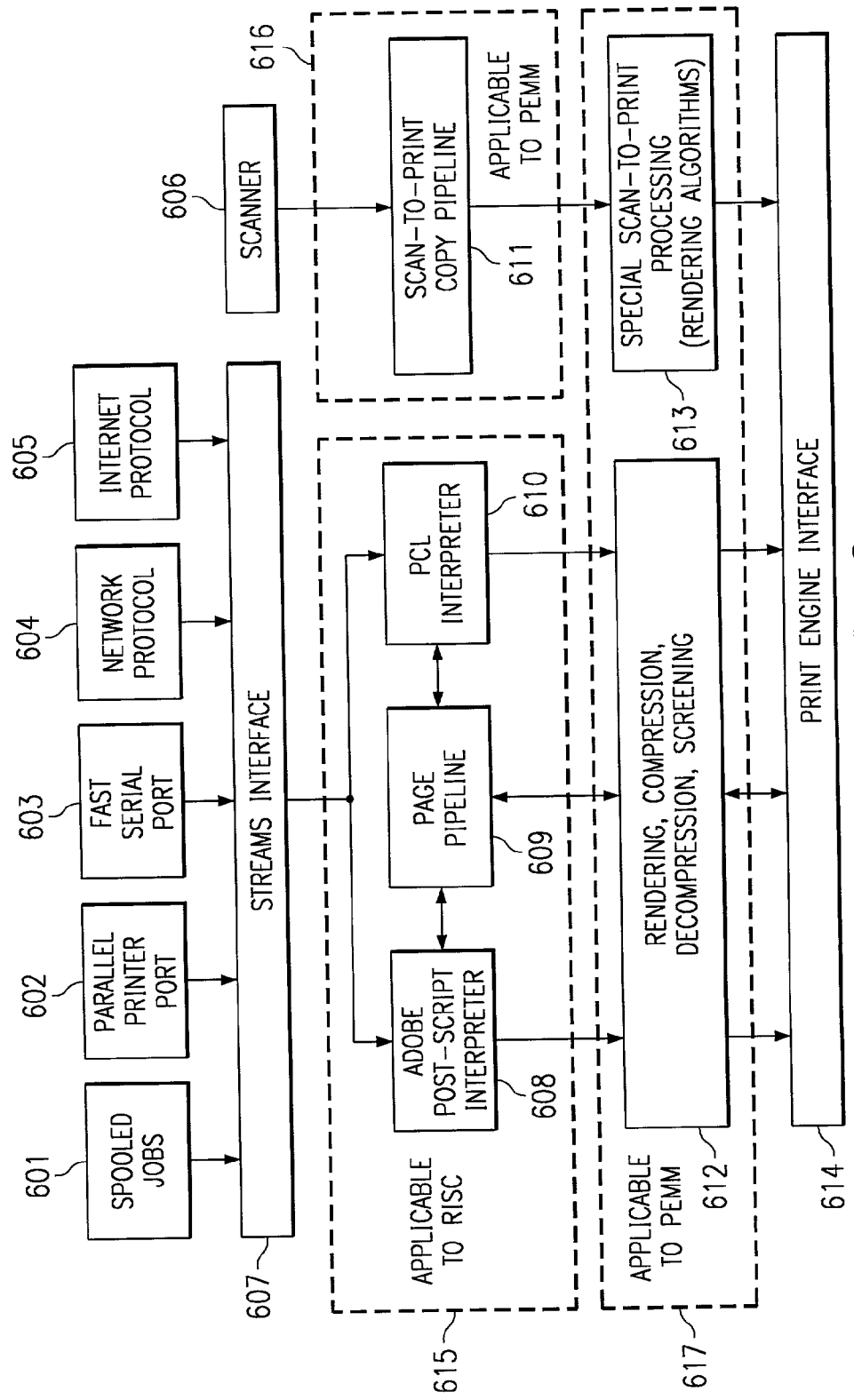
FIG. 6 illustrates full printer controller functions as implemented using the processor enhanced memory module.

A high-level view of the full complement of printer pipeline functions is illustrated in FIG. 6. The input data has a variety of sources such as spooled jobs 601, parallel printer port 602, fast serial port 603, network protocol 604 and Internet protocol 605, each with its specific data format. This data must be reduced to a common format for processing in the pipeline. As an example, within the streams interface unit 607, input data from the fast serial port 603 would be sent through a serial to parallel interface which is accomplished by way of serial-in parallel-out register function. As another example, data which arrives in parallel form from another input port but with word size less than a full 32 bits is normally converted to 32 bits for uniform processing in later stages.

Data from the streams interface unit 607 is parceled into two separate paths that perform parallel interpretation of the composite postscript 608 and printer control language PCL statements 610. For page oriented processing the results of these two interpretation processes are re-assembled into page format in the page pipeline block 609 before being submitted to the rendering process step 612. Banded format data may be sent directly from the post script interpreter 608 and the PCL interpreter 610 by separate parallel paths to the rendering step 612.

FIG. 6 also illustrates a scan-to-print pipeline function wherein the scanner output is generated in the form of bit map data but with scanner specific characteristics. This data needs no 'interpretation' process as such but will be reduced to a common form in a first scan-to-print pipeline stages 611 before being subjected to the rendering algorithms 613 specific to this type of processing.

FIG. 6 also illustrates the portions of the total printer pipeline functions which are amenable to RISC processing 615 and those which are amenable to PEMM processing with the embedded DSP processor 616 and 617.

A PEMM, usually in the form factor of a standardized memory module, comprises memory, a processing element in the present embodiment DSP, and any necessary embedded control hardware or software to handle its interface to the host system. The DSP of the PEMM is dedicated to the rendering process which is the multiply-accumulate intensive portion of the printer controller pipeline requirement. The PEMM operates in the direct memory map of the main printer processor, and not on a separate peripheral bus, the PEMM enables true parallel processing at the highest possible system bandwidth.

Figure 7:
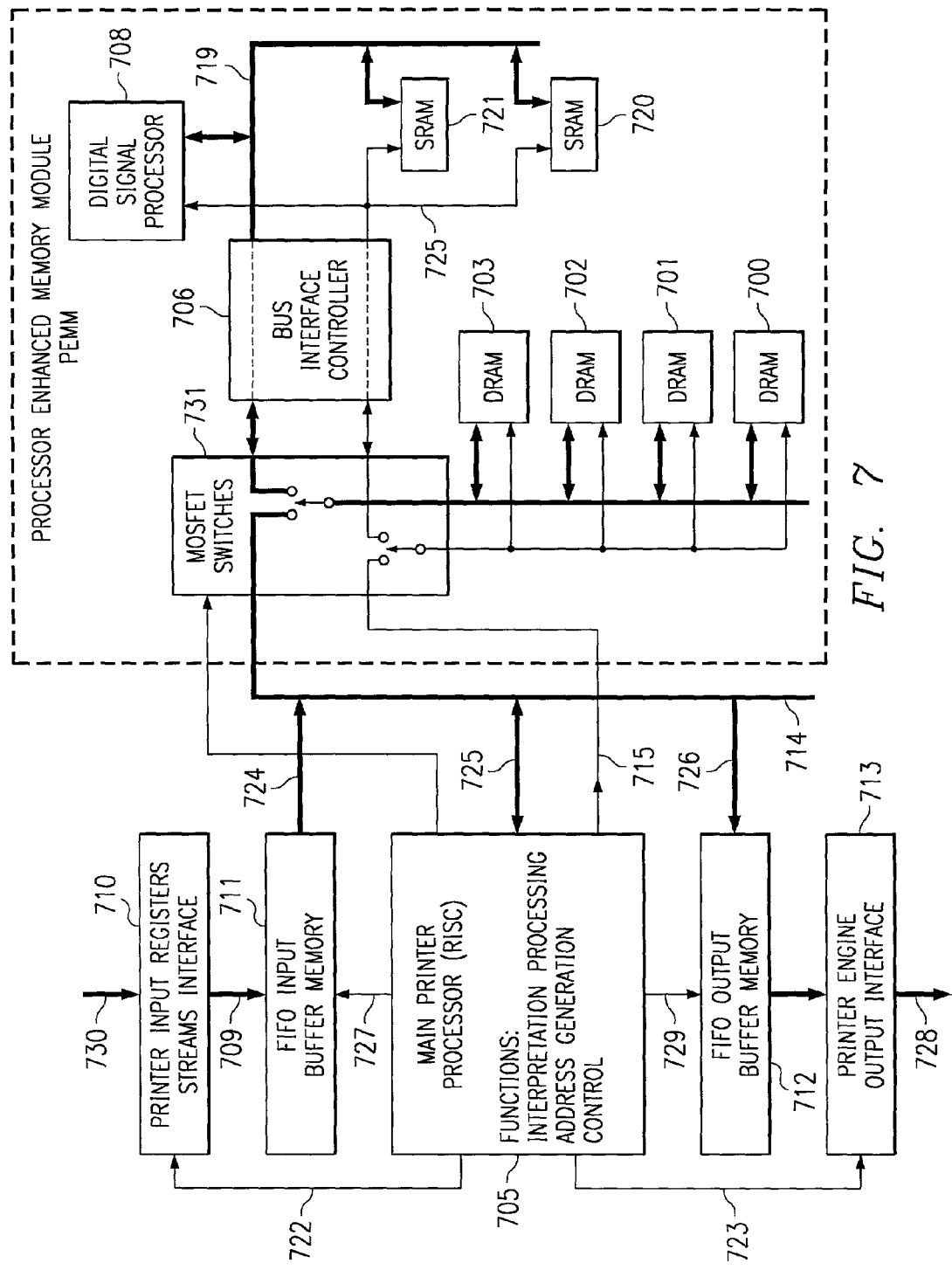
FIG. 7 illustrates the printer controller pipeline of this invention employing processor enhanced memory modules.

The PEMM can be incorporated into the hardcopy image processing pipeline of existing controllers by using the smart local memory model as illustrated in FIG. 7. Here the data generated from RISC based PDL interpretation or pre-rasterized data can be processed in an accelerated fashion into page bit maps, color space converted, and compressed by the PEMM. Since the DSP on the PEMM is programmable, the resolution, color space, and type of compression along with other printer specific processing can have formats other than those normally determined by the fixed functionality of ASIC devices. The PEMM could also be used to replace other ASIC sometimes used, reducing the cost and potentially the performance of the controller.

The PEMM could also be used as a scan to print add-on processor giving the controller multifunction capability. Again the smart memory model would allow raster data captured from a scanner to be processed into printer specific raster data. Adding the PEMM would greatly increase the functionality of existing controller boards and offer very low cost multifunction up-grades.

FIG. 7 illustrates a printer controller pipeline using processor enhanced memory module PEMM. Input data/instructions 730 from the personal computer printer driver is received at the printer input registers streams interface 710 which includes capability to reduce any form of input listed in blocks 601 through 605 of FIG. 6 to one common form for storage in the FIFO input buffer memory 711. The main processor 705 directs the data from the FIFO 711 to be stored in the DRAM memory 700–703 and retrieved as needed by the main processor 705.

In this architecture the main processor 705 performs control and addressing functions, but only interpretation pipeline processing. Data is passed from the DRAM to the processor and from the processor to the DRAM at all incremental process steps. Rendering is performed exclusively by DSP 708 using its own local SRAM memory 720, 721 for temporary storage. When rendering is complete, the data is again stored in DRAMs 700–703. Pipeline output data is passed to the FIFO output buffer memory 712 in a form suitable to supply the printer engine output registers 713 with printer specific raster data 728 as needed. Memory bus 714 provides a common I/O path for data to and from the input FIFO 724, the main processor 725, and the output FIFO 726. Processor control signals, 715, 727 and 727, direct memory and FIFO functions. Signals 722 and 723 are main processor control signals for the input and output registers respectively. MOSFET switches 731, under control of the main processor unit, allow the source of address and data to be switched from the main processor unit or the bus interface controller 706.

It is important to note that the rendering process is a highly intensive multiply-accumulate function to which the DSP is extremely well-suited. In addition the isolation between the two processors, RISC and DSP, allows for extremely efficient parallel processing, a basic requirement for effective parallel processing.

The fundamental uniqueness of the PEMM in the PC or on a controller board is that any hardcopy, or any multimedia processing pipeline has multiplier-accumulate intensive elements can be cost effectively accelerated with a mass produced fully integrated smart memory supplement.

Another way to think of it is that it can turn any RISC or RISC plus ASIC solution into a RISC plus DSP solution by adding a PEMM. Another way to think about it is that the RISC plus DSP hardware does MMX multi-media specific instructions that only some subset of RISC processors now do as an adjunct to its instruction set architecture.

Most specifically to this patent is that the PEMM can operate at the graphics display interface GDI processing level as an accelerator. This means only one set of drivers needs to be written for the GDI calls made within the operating system to the PEMM. It will operate below the application level environment.

What is claimed is:

1. A smart memory device for use in a printer comprising:
   a standard memory module connector adapted for interface of a plurality of electrical leads with a memory module socket;
   a controllable switch having a first set of leads connected to said plurality of electrical leads of said connector, a second set of leads and a third set of leads, said controllable switch selectively connecting said first set of leads to either said second set of leads or to said third set of leads;
   a memory connected to said second set of leads of said controllable switch; and
   a digital signal processor connected to said third set of lead of said controllable switch, said digital signal processor programmed to render data stored in said memory into printer specific raster image data and store said rendered data in said memory.

2. The smart memory of claim 1, wherein:
said memory consists of a plurality of banks of dynamic random access memory.

3. The smart memory of claim 1, further comprising:
a local memory connected to said digital signal processor for temporary storage of data; and
a bus interface connecting said digital signal processor and said local memory to said third leads of said controllable switch, whereby data may be transferred from said memory to said local memory and from said local memory to said memory.

4. The smart memory of claim 1, wherein:
said local memory consists of static random access memory.

5. The smart memory of claim 1, wherein:
said standard memory module connector consists of a single in line memory module connector.

6. The smart memory of claim 1, wherein:
said standard memory module connector consists of a dual in line memory module connector.

7. A printer controller comprising:
a input port for receiving input print data;
an input first-in-first-out memory having an input connected to said input port and an output;
an output first-in-first-out memory having an input and an output;
an output port for outputting printer specific raster image data to a print engine;
a memory module socket;
a smart memory module including
   a standard memory module connector adapted for interface of a plurality of electrical leads with said memory module socket,
   a controllable switch having a first set of leads connected to said plurality of electrical leads of said connector, a second set of leads and a third set of leads, said controllable switch selectively connecting said first set of leads to either said second set of leads or to said third set of leads,
   a memory connected to said second set of leads of said controllable switch, and
   a digital signal processor connected to said third set of lead of said controllable switch, said digital signal processor programmed to render data stored in said memory into printer specific raster image data and store said rendered data in said memory; and
a data processor connected to said input first-in-first-out memory, to said output first-in-first-out memory and to said memory module socket, said data processor programmed to
   transfer data out of said input first-in-first-out memory via said output to said smart memory module, interpret print data into a display list equivalent and store the display list equivalent in said smart memory module, and transfer data rendered by said smart memory module to said input of said output first-in-first-out memory.

8. The printer controller of claim 7, wherein:
said memory consists of a plurality of banks of dynamic random access memory.

9. The printer controller of claim 7, further comprising:
a local memory connected to said digital signal processor for temporary storage of data; and
a bus interface connecting said digital signal processor and said local memory to said third leads of said controllable switch, whereby data may be transferred from said memory to said local memory and from said local memory to said memory.

10. The printer controller of claim 7, wherein:
said local memory consists of static random access memory.

11. The printer controller of claim 7, wherein:
said standard memory module connector consists of a single in line memory module connector.

12. The printer controller of claim 7, wherein:
said standard memory module connector consists of a dual in line memory module connector.

\* \* \* \* \*